US012602477B2

(12) United States Patent
Brant et al.

(10) Patent No.: US 12,602,477 B2
(45) Date of Patent: Apr. 14, 2026

(54) DETECTING TARGETED INTRUSION ON MOBILE DEVICES

(71) Applicant: CrowdStrike, Inc., Sunnyvale, CA (US)

(72) Inventors: Connor Brant, Latham, NY (US); David Williams, Cheltenham (GB)

(73) Assignee: CrowdStrike, Inc., Sunnyvale, CA (US)

( * ) Notice: Subject to any disclaimer, the term of this patent is extended or adjusted under 35 U.S.C. 154(b) by 402 days.

(21) Appl. No.: 18/141,703

(22) Filed: May 1, 2023

(65) Prior Publication Data

US 2024/0370560 A1     Nov. 7, 2024

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ............. G06F 21/566; G06F 2221/034; G06F 21/1064; G06F 21/121; G06F 21/556; G06F 21/56; G06F 2221/2149; G06F 21/55; G06F 21/552; G06F 21/554; H04L 63/14; H04L 63/1441; H04L 63/1425
See application file for complete search history.

(56) References Cited

U.S. PATENT DOCUMENTS

| | | | | |
|---|---|---|---|---|
| 8,615,805 | B1 * | 12/2013 | Obrecht | G06F 21/566 |
| | | | | 713/188 |
| 8,997,230 | B1 * | 3/2015 | McCauley | G06F 21/554 |
| | | | | 726/23 |
| 9,921,884 | B1 * | 3/2018 | McInerny | G06F 16/188 |
| 10,733,594 | B1 * | 8/2020 | Dai Zovi | H04L 63/1425 |
| 11,316,877 | B2 * | 4/2022 | Krebs | G06F 21/552 |
| 2009/0144821 | A1 * | 6/2009 | Wong | G06F 21/552 |
| | | | | 726/22 |
| 2018/0018459 | A1 * | 1/2018 | Zhang | G06F 21/566 |
| 2018/0331886 | A1 * | 11/2018 | Schroeder | H04L 69/40 |
| 2019/0050568 | A1 * | 2/2019 | Kataoka | G06F 21/56 |
| 2020/0077265 | A1 * | 3/2020 | Singh | H04L 63/0272 |
| 2022/0391198 | A1 * | 12/2022 | Decrop | H04L 51/02 |
| 2024/0152613 | A1 * | 5/2024 | Braggs | G06F 21/566 |

OTHER PUBLICATIONS

Hata et al, A Log Aggregation Design Criteria for Robust SIEM (Security Information and Event Management) in Enhancing Threat Detection, 8th IEEE International Conference and Workshop on Recent Advances and Innovations—ICRAIE 2023, IEEE Record #59459, p. 1-6 (Year: 2023).*

* cited by examiner

*Primary Examiner* — Christopher A Revak
(74) *Attorney, Agent, or Firm* — Lee & Hayes, P.C.

(57) ABSTRACT

Techniques to determining a program installed on a computing device may be indicative of performing a targeted intrusion of the computing device is described. A log file associated with the computing device may be generated. Various indicators from the log file may be determined. A security program may determine that the program may be indicative of performing the targeted intrusion based on at least one of the indicators. The security program may determine an action to take based on the indication of performing the targeted intrusion.

20 Claims, 6 Drawing Sheets

400

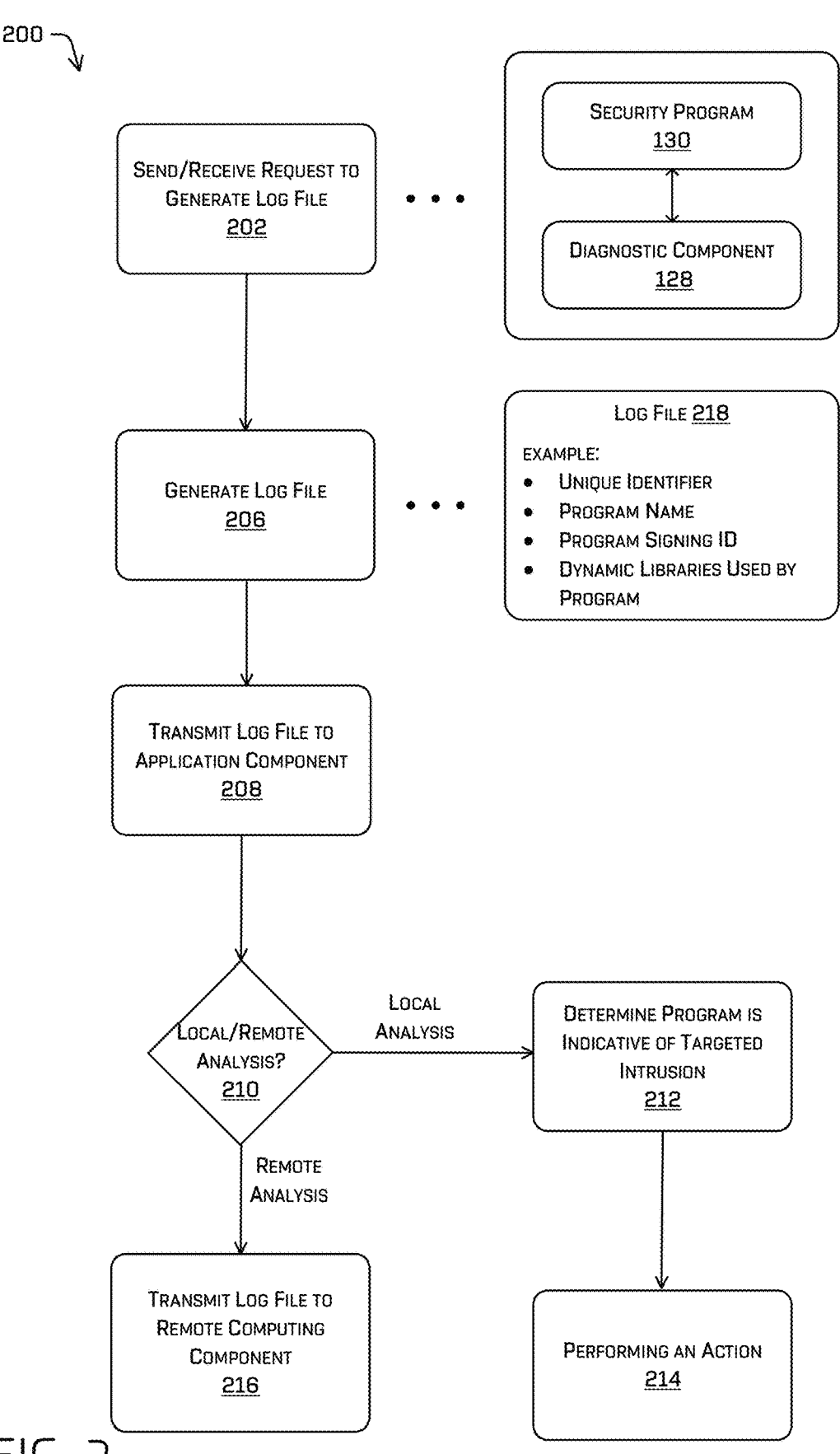

200

SEND/RECEIVE REQUEST TO GENERATE LOG FILE
202

• • •

SECURITY PROGRAM
130

DIAGNOSTIC COMPONENT
128

GENERATE LOG FILE
206

• • •

LOG FILE 218

EXAMPLE:
- UNIQUE IDENTIFIER
- PROGRAM NAME
- PROGRAM SIGNING ID
- DYNAMIC LIBRARIES USED BY PROGRAM

TRANSMIT LOG FILE TO APPLICATION COMPONENT
208

LOCAL/REMOTE ANALYSIS?
210

LOCAL ANALYSIS

DETERMINE PROGRAM IS INDICATIVE OF TARGETED INTRUSION
212

REMOTE ANALYSIS

TRANSMIT LOG FILE TO REMOTE COMPUTING COMPONENT
216

PERFORMING AN ACTION
214

RECEIVE LOG FILE
302

RECEIVE SYSTEM IMAGE
304

DETERMINE MATCHING
BETWEEN LOG FILE AND
SYSTEM IMAGE
306

DETERMINE WHETHER A
PROGRAM IS INDICATIVE OF
TARGETED INTRUSION
308

PERFORM AN ACTION
310

• • •

ACTION 312
• GENERATE NOTIFICATION
• GENERATE INSTRUCTIONS

400

IDENTIFIERS 412

- DEVICE MODEL
- OS VERSION
- PROGRAM DETAILS
  - ⋮
- SIGNING IDENTITIES
- UUID

DETERMINE LOG FILE
IDENTIFIERS
402

GENERATE SYSTEM IMAGE
406

IDENTIFIERS 414

- PROCESS (1) UUID
- PROCESS (2) UUID
- PROCESS (3) UUID
  - ⋮
- PROCESS (N) UUID

DETERMINE SYSTEM IMAGE
IDENTIFIERS
408

DETERMINE A DIFFERENCE
BETWEEN LOG FILE
IDENTIFIERS AND SYSTEM
IMAGE IDENTIFIERS
410

DETECTING TARGETED INTRUSION ON MOBILE DEVICES

BACKGROUND

With mobile devices use forming an ever-greater part of day to day life, security exploits and cyberattacks directed to stealing and destroying computer resources, data, and private information are becoming an increasing problem. Some attacks are carried out using "malware" or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware may perform a targeted intrusion of a computing device and is increasingly obfuscated or otherwise disguised in an effort to avoid detection by security software. Because operating systems for mobile devices (also referred to as mobile operating systems) are generally designed to prevent a program from being able to real-time monitor other programs executed on the device, determining whether a program is malware or is performing a targeted intrusion can thus be difficult and limited in scope.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is an illustration of an example process of generating and analyzing a log file for targeted intrusion at a device, as described herein.

DETAILED DESCRIPTION

Figure 1:
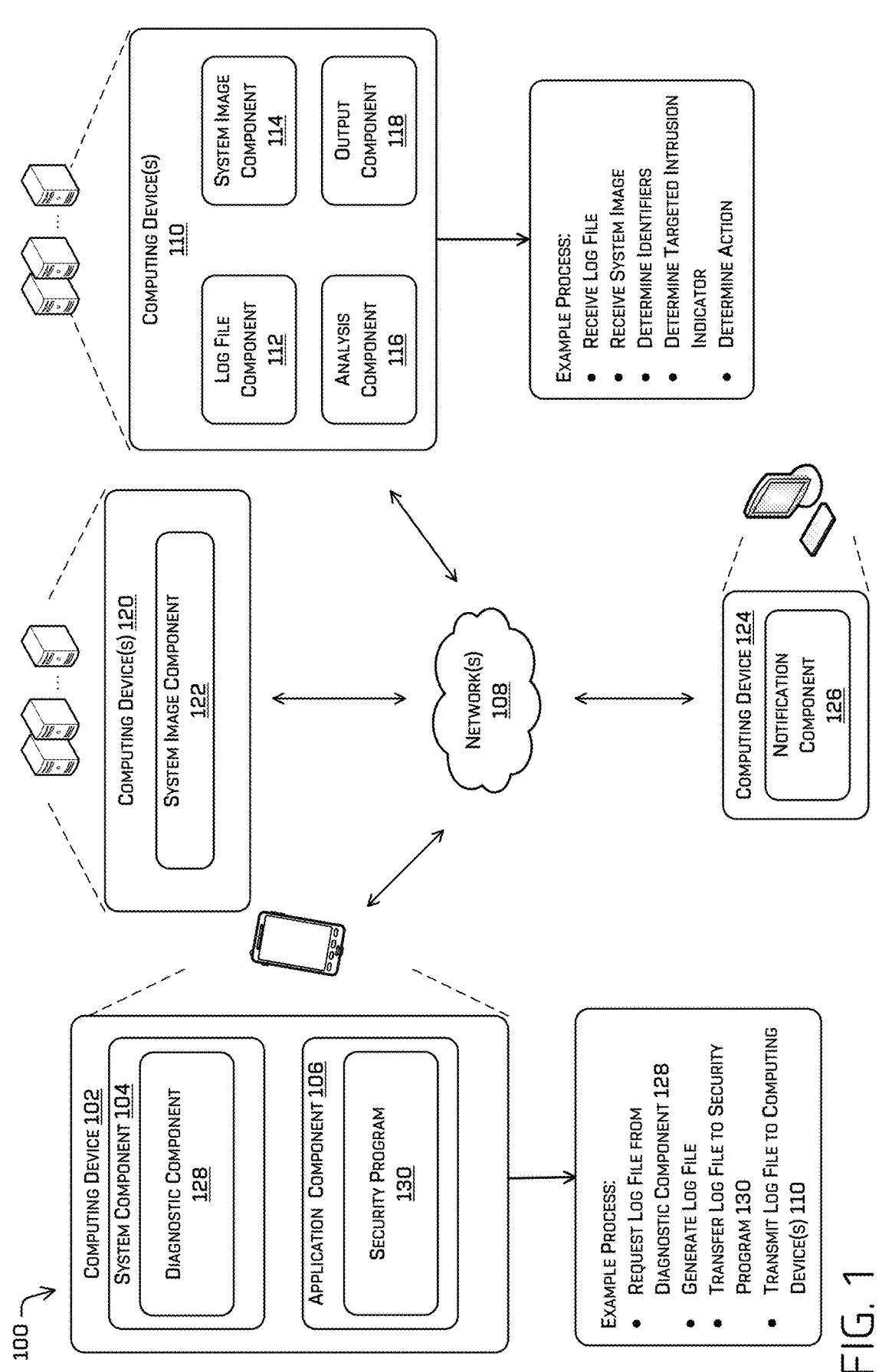
FIG. 1 illustrates an example block diagram of an example computer architecture for determining whether a program contain an indicator for targeted intrusion of an operating system, as described herein.

This application is directed to a system for determining whether a program(s) (also referred to as process(es)) being executed at a computing device is indicative of performing a targeted intrusion of the computing device. In some examples, the system may instruct the computing device to generate one or more log files. In some examples, the system may analyze a log file for currently executing program(s) to determine whether the program(s) may be indicative of bypassing a restricted mode placed by an operating system (OS) associated with the computing device (e.g., obtaining elevated or system level administrative privileges without permission from the operating system) and/or indicative of performing the targeted intrusion. In some examples, upon determining that a program may be indicative of bypassing the restricted mode and/or indicative of the targeted intrusion, the system may perform an action to mitigate further execution of the program. By implementing the techniques described herein, the system can safeguard the computing device and/or a user of the computing device from being further harmed or compromised by a program designed to perform the targeted intrusion.

In some examples, the computing device may be a mobile device (e.g., a smartphone, a tablet, or the like). In some examples, the operating system may be a mobile operating system (e.g., Apple iOS, Google Android, or the like). In some examples, a program installed on the computing device may, by default, be configured to execute in a restricted mode. In some examples, the restricted mode sandboxes the program such that the program is generally able to only modify its own settings, files, databases, libraries, and the like and is unable to access, utilize, or modify the settings, files, databases, libraries of other programs installed on the computing device or modify system wide settings. In some examples, modifying may include, but is not limited to, copying, deleting, editing, and the like.

In some examples, the computing device may include a system component (also referred to as an OS component) where the programs installed at the system component may, by default, execute in an unrestricted mode. In some examples, the unrestricted mode may enable the program to modify other programs' settings, files, databases, libraries and the like as well as modify system wide settings. In some examples, the unrestricted mode may be referred to as an administrator privilege or mode or an elevated privilege or mode. In some examples, the system component may be restricted to programs that are installed by a developer of the operating system or a manufacturer of the computing device during manufacturing of the computing device or at least before the computing device is made available to a firsthand retailer or firsthand user. In such an example, the user installed or a third-party installed program would be restricted from being installed at the system component. Instead, in some examples, a user installed or a third-party installed program may only be installed at an application component and be subject to being executed in the restricted mode. In some examples, the system component and the application component may be located at different storage mediums. In some examples, the system component and the application component may be located at different partitions or filesystems at a same storage medium. In some examples, there may be scenarios where a program may be able to bypass the restricted mode and even perform a targeted intrusion of the computing device.

In one scenario, a program may bypass the restricted mode by being installed at the system component. In some examples, a user with the relevant privilege may perform such an installation. In some examples, the program may be installed at the system component through using an exploit or a security flaw. When installed at the system component, the program would be able to execute in the unrestricted mode and therefore, bypass the restricted mode. In another scenario, the program may be installed at the application component, but may use an exploit or security flaw to change from the restricted mode to the unrestricted mode.

In some examples, the program that bypasses the restricted mode may further be designed to perform a targeted intrusion of the computing device. In some examples, the targeted intrusion may be configured to copy personally identifying information (PII) stored at the computing device and transmit the PII to a remote computing device. In some examples, the targeted intrusion may be configured to activate certain components of the computing device such as its camera and/or microphone and initiate recording of the camera and/or microphone and transmit the recording to the remote computing device. In some examples, the targeted intrusion may be configured to further allow the program to read and copy texts and emails stored at the computing device, monitor usage of some or all apps installed at the computing device, track location data associated with the computing device, and the like. In some examples, all such information collected by the program may be transmitted to the remote computing device. In some examples, because the targeted intrusion may generally access data from other programs and/or system wide settings, a program that is designed to perform the targeted intrusion may also be designed to bypass the restricted mode.

In some examples, a security program may be installed at the computing device to determine whether one or more programs installed on the computing device may be indicative of bypassing the restricted mode and/or performing the targeted intrusion. In some examples, due to the security program being placed in the restricted mode, the security program may be restricted from evaluating other programs installed on the computing device in real-time. Instead, the security program may be configured to determine whether an installed program may be indicative of bypassing the restricted mode and/or performing the targeted intrusion using a log file that may be generated by the computing device.

In some examples, the log file may be one or more files that includes a record of all programs currently installed and/or executing on the computing device. In some examples, the log file may contain details about each program such as a name of the program, a unique identifier associated with the program, a signing identifier associated with the program, static and dynamic libraries associated with the program, databases associated with the program, files associated with the program, and the like. In some examples, the security program may request that the computing device generate the log file. In some examples, in response to the request, the computing device may generate the log file at the system component and transfer the log file to the security program. In some examples, the security program may determine, at the computing device, that one or more programs recorded in the log file may be indicative of bypassing the restricted mode and/or performing the targeted intrusion. In some examples, the security program may perform one or more actions based on a program being indicative of bypassing the restricted mode and/or performing the targeted intrusion such as generating a notification, generating instructions, or otherwise facilitating the removal or quarantine of the program.

In some examples, the computing device may lack the memory, storage, or processing capability to determine whether one or more programs recorded in the log file may be indicative of bypassing the restricted mode and/or performing the targeted intrusion. In such a scenario, the security program may transmit the log file to a remote computing device with sufficient memory, storage, and processing capability, and the remote computing device may proceed to determine whether the one or more apps may be indicative of bypassing the restricted mode and/or performing the targeted intrusion. The remote computing device may further receive a system image that is indicative of the initial state of the operating system associated with the computing device. In some examples, the system image may include programs that are preinstalled by the developer of the operating system or the manufacturer of the computing device. In some examples, these preinstalled programs may be presumed to be clean. In some examples, the system image may include details about these preinstalled programs that correspond to the log data.

In some examples, the remote computing device may determine whether a program associated with the log file may be indicative of bypassing the restricted mode and/or performing the targeted intrusion. In some examples, the program may be determined to be indicative of bypassing the restricted mode when, even though an identifier associated with the program matches with an identifier associated with one of the preinstalled programs, the program is determined to be accessing and/or utilizing libraries that it does not own, is not assigned to, or otherwise has not authority to access. In some examples, the program may be determined to be indicative of performing the targeted intrusion when the identifier associated with the program does not match any of the identifiers associated with the preinstalled program and a name of the program is determined to be imitating one of the preinstalled programs. In some examples, the imitation may be determined by evaluating a Levenshtein distance between the name of the program and the name of the preinstalled program. In some examples, upon determining that the program may be indicative of bypassing the restricted mode and/or performing the targeted intrusion, the remote computing device may perform an action that corresponds to the action described in association with action performed on the computing device.

Techniques described herein provide various technical and operational benefits to operating a computing device. For example, by determining whether a program is indicative of bypassing the restricted mode and/or performing the targeted intrusion, a user can have confidence in the safety and security of the computing device, and the computing device can be kept safe and secure. In some examples, by performing this technique right after generating the log file, the user can be assured that the evaluation is being made at near real-time and the result would not be outdated. For another example, determining whether a program bypassing the restricted mode and/or performing the targeted intrusion on a remote computing device allows the computing device to perform other tasks and save power and battery life while the evaluation is ongoing.

The techniques described herein may be implemented in a number of ways. Example implementations are provided below with reference to the following figures. Although discussed in the context of a security program and mobile devices, the methods, apparatuses, techniques, and systems, described herein can be applied to a variety of systems (e.g., data storage systems, service hosting systems, cloud systems, and the like), and are not limited to security programs or mobile devices.

FIG. 1 illustrates an example diagram 100 of an example computer architecture for determining whether a program contain an indicator for targeted intrusion of an operating system, as described herein. The diagram 100 may a first computing device 102, a second computing device 110, a third computing device 120, and a fourth computing device 124. In some examples, the first computing device 102, the second computing device 110, the third computing device 120, and the fourth computing device 124 may be communicatively connected via network(s) 108. In some examples, the second computing device 110 may be a plurality of computing devices as illustrated. In some examples, the second computing device 110 may be a single computing device. In some examples, the diagram 100 illustrates a security service system that may be part of or associated with a cloud-based service network that is configured to implement aspects of the functionality described herein.

In some examples, the network(s) 108 may include any one or more networks, such as wired networks, wireless networks, and combinations of wired and wireless networks. Further, in some examples, the network(s) 108 may include any one or combination of multiple different types of public or private networks (e.g., cable networks, the Intranet, the Internet, wireless networks, etc.). In some examples, the computing devices 102, 110, 120, and 124 may communicate over the network(s) 108 using a secure protocol (e.g., https) and/or any other protocol or set of protocols, such as the transmission control protocol/Internet protocol (TCP/IP).

In some examples, the first computing device 102 may be any suitable type of computing device, including, but not limited to, a mobile device (e.g., a smartphone, a mobile phone (also referred to as a cellular phone), a personal digital assistant (PDA), a tablet computer, or the like), a personal computer (PC), a laptop computer, a server, an embedded system, an Internet of Things (IoT) device, or any other sort of device or devices capable of communicating via network(s) 108 with the second computing device 110.

In some examples, the first computing device 102 may be configured to run any compatible device operating system (OS), including but not limited to, Apple iOS, Google Android, Microsoft Windows Mobile, Linux Mobile, Microsoft Windows, Linux, Unix, as well as any other device OS.

In some examples, first computing device 102 may include a system component 104 (also referred to as an operating system (OS) component) and an application component 106. In some examples, the system component 104 and the application component 106 may be located at separate partitions or filesystems of a memory associated with the first computing device 102. In some examples, programs associated with the application component 106 (e.g., installed at the application component 106) may be configured to execute in a restricted mode such that each program are sandboxed in separate instances such that the program is only able to modify its own settings and/or files, libraries, and/or databases, real time monitor its own execution, or is only able to real time monitor other components (e.g., hardware and software) of the first computing device 102 in a limited fashion. In the example that the first computing device 102 is running a mobile device OS (e.g., Apple IOS, Google Android, Microsoft Windows Mobile, Linux Mobile, or the like), all programs associated with the application component 106 may be configured to execute in the restricted mode by default.

In some examples, programs associated with the system component 104 may be configured to execute in an unrestricted mode. In some examples, the unrestricted mode permits the program to change system wide settings and modify settings, file, libraries, and/or databases associated with other programs installed on the first computing device 102. In some examples, the unrestricted mode may also permit programs to monitor the operating system and all programs installed on the operating system in real time or proximate real time. In some examples, the unrestricted mode may permit real time monitoring of the operating system and all programs installed on the operating system by permitting a program to install a monitoring component within a kernel of the operating system. In some examples, all programs associated with the system component 104 may be configured to execute in the unrestricted mode by default.

In some examples, the system component 104 may include programs and/or processes installed by the developer of the operating system. In some examples when manufacturer of the first computing device 102 is different from the developer of the operating system, the system component 104 may further include programs and/or processes installed by the manufacture of the first computing device 102. In some examples each program installed on the first computing device 102 may be associated with one or more static libraries and dynamic libraries.

In some examples, a program associated with the application component 106 may be configured such that the restricted mode is removed or otherwise bypassed. In some examples, a program may be installed directly onto the system component 104 in order to bypass the restricted mode. In some examples, the program may utilize one or more exploits to take advantage of one or more security flaws within the operating system to remove or bypass the restricted mode. In some examples, the program may be configured to remove or bypass the restricted mode in order to perform a targeted intrusion of the first computing device 102. In some examples, the program configured to perform the targeted intrusion may be a malware. In some examples, the targeted intrusion may be configured to copy personally identifying information (PII) stored at the first computing device 102 and transmit the PII to a remote computing device. In some examples, the targeted intrusion may be configured to activate certain components of the first computing device 102 such as its camera and/or microphone and initiate recording of the camera and/or microphone and transmit the recording to the remote computing device. In some examples, the targeted intrusion may be configured to further permit the program to read and copy texts and emails stored at the first computing device 102, monitor usage of some or all apps installed at the first computing device 102, track location data associated with the first computing device 102, and the like. In some examples, all such information collected by the program that performs the targeted intrusion may be transmitted to the remote computing device. In some examples, the remote computing device may be owned or otherwise under control by a developer of the program configured to perform the targeted intrusion and/or a user of the program (e.g., the user who facilitated the installation of the program on the first computing device 102).

In some examples, a security program 130 configured to identify whether the one or more programs and/or processes may be indicative of performing a targeted intrusion of the first computing device 102 may be installed within the application component 106. In some examples, because the operating system places the restricted mode on all programs associated with the application component 106 by default, the security program 130 is not able to identify, in real time, whether a program installed on the first computing device 102 may be indicative of performing a targeted intrusion. In some examples, being in the restricted mode includes the security program 130 being prevented from installing a monitoring component into a kernel of the operating system to monitor indications of targeted intrusion. Instead, in such an example, the security program 130 may instead be configured to identify whether the program may be indicative of performing the targeted intrusion using a log file generated by the operating system.

In some examples, the operating system may be configured to generate the log file at a diagnostic component 128 within the system component 104. In some examples, the operating system generating the log file at the diagnostic component 128 may be a diagnostic feature that is designed into the operating system, such as by the developer of the operating system and/or the manufacturer of first computing device 102. In some examples, the log file may be referred to as a diagnostic package. In some examples, the log file may be a file that is used for diagnosing and troubleshooting the first computing device 102 by another program or by a user via a user interface associated with the operating system. In some examples, the log file may include relevant information about all programs installed on the first computing device 102 where such relevant information may indicate whether one or more installed programs may be indicative of performing the targeted intrusion. In some examples, the log file may include one or more identifiers associated with one or more installed programs that may be used as a part of an evaluation or analysis to determine whether an installed program may be indicative of the targeted intrusion. In some examples, the log file may indicate a current state of the operating system associated with the first computing device 102.

In some examples, the security program 130 may generate and transmit a request to the system component 104 for the operating system to generate the log file. In some examples, in response to the request, the system component 104 may generate and/or store the log file at the diagnostic component 128. In some examples, as discussed above, the generation of the log file is a built-in feature of the operating system designed by the developer of the operating system and/or the manufacturer of the first computing device 102. In some examples, the system component 104 may transfer or transmit the log file from the diagnostic component 128 to the security program 130 based on the request. Generation of the log file by the system component 104 is discussed in more detail with respect to FIG. 2 as well as throughout this disclosure.

In some examples, as illustrated in FIG. 1, the security program 130 may be configured to transmit the log file to a remote computing device (e.g., the second computing device 110) where the second computing device 110 may perform an evaluation of the log file to determine whether one or more installed programs may be indicative of performing the targeted intrusion. In some examples, additionally or alternatively, the security program may perform such an analysis at the first computing device 102.

In some examples, the second computing device 110 may be a remote computing device or remote computing devices such as a server or a server cluster. In some examples, the second computing device 110 may include a log file component 112, a system image component 114, an analysis component 116, and an output component 118. In some examples, each of the components 112, 114, 116, and 118 may be executed using one or more processors associated with the second computing device 110. In some examples, the log file component may include the log file received from the first computing device 102. In some examples, the system image component may be a system image received from the third computing device 120. In some examples, the analysis component may be configured to analyze the log file to determine whether a program may be indicative of performing the targeted intrusion by analyzing the log file associated with the log file component 112 in connection with the system image associated with the system image component 114, and determine an action associated based on that determination. In some examples, the second computing device may perform the action using the output component

118 such as directing at least one of the first computing device 102 or the fourth computing device 124 to generate a notification. In some examples, the action may be generating and outputting (e.g., displaying, via sound, via haptics, or the like) a notification and/or instructions. The steps performed by the second computing device 110 is discussed in more detail with respect to FIGS. 3-5 as well as this disclosure.

In some examples, the third computing device 120 may be a similar computing device to the second computing device 110. In some examples, the third computing device 120 may include a system image component 122. In some examples, the third computing device 120 may be a computing device that is under the control of the developer of the operating system associated with the first computing device 102. In some examples, the system image component 122 may be stored in memory and executed on one or more processors to generate and transmit a system image to the system image component 114 of the second computing device 110. In some examples, the generated system image may be based on one or more identifiers associated with the first computing device 102 and its associated operating system. In some examples, the system image may be indicative of an initial state of the operating system (e.g., a new factory install of the operating system).

In some examples, the fourth computing device 124 may be a similar computing device to the first computing device 102. In some examples, the fourth computing device 124 may be under the control of an information technology (IT) administrator assigned to monitor and/or configure the first computing device 102. In some examples, the fourth computing device 124 may include a notification component 126. In some examples, the notification component 126 may be configured to receive a notification regarding one or more programs or processes on the first computing device 102 and/or instructions for operating the first computing device 102 from the output component 118 or generate a notification regarding one or more programs and processes on the first computing device 102 and/or instructions for operating the first computing device 102 based on instructions received from the output component 118.

FIG. 2 is an illustration of an example process 200 for generating and analyzing a log file for targeted intrusion at a computing device, as described herein. The process 200 may be implemented on a computing device such as the first computing device 102 as illustrated in FIG. 1. In some examples, the process 200 may be implemented, at least partly, on a different computing device as illustrated in FIG. 1.

At operation 202, the process can include sending and receiving a request to generate a log file. In some examples, the request to generate the log file may be sent by a security program such as the security program 130 that is associated with the application component 106 to the system component 104 as described in association with FIG. 1. As discussed in association with FIG. 1 as well as throughout this disclosure, the security program may be installed on a mobile device running a mobile operating system. As such, the mobile device may restrict the security program from real time monitoring of the mobile operating system and the programs installed on the first computing device 102 (e.g., by preventing the security program from installing a monitoring component into its kernel). Instead, the security program may monitor the operating system and the installed programs by requesting the operating system to generate a log file, or accessing an otherwise generated log file, and evaluating the log file for program(s) that may indicate targeted intrusion of the first computing device 102. In some examples, the request to generate a log file may be responsive to a command to analyze or evaluate the first computing device 102 for programs that may be indicative of performing targeted intrusion of the first computing device 102. In some examples, the command may be automatically generated by the security program based on a schedule and/or a trigger condition (e.g., generating the command daily, weekly, monthly, and the like). In some examples, the command may be generated on demand by the security program based on user request and/or input (e.g., on demand). In some examples, the security program may include a user interface that allow a user to select an option to begin the process that triggers the generation of the log file and/or the local or remote evaluation of the log file for indications of targeted intrusion.

At operation 206, the process can include generating the log file. In some examples, the log file may be generated based on the request to generate the log file, and may include accessing the diagnostic component 128 by the operating system to generate the log file. In some examples, the log file may be generated and stored at the diagnostic component 128 by the operating system. In some examples, the log file may indicate a current state of the first computing device 102 and/or the current state of the operating system associated with the first computing device 102. In some examples, the log file may be used for diagnostics and/or troubleshooting and as such may include a record of all currently installed programs (e.g. apps) and all currently executing programs. In some examples, as illustrated in log file 218, the log file may include, for each of the installed program and/or each of the executing program, a name, a first identifier (e.g., a unique identifier (UUID)), a second identifier (e.g., a program signing identifier such as a code signature, a certificate, an app store identifier, or the like), one or more libraries associated with the program (e.g., static library, dynamic library, and the like that are utilized and/or called by the program), and the like. In some examples, the log file can include additional details such as those provided in identifiers 412 of FIG. 4.

In some examples, the log file may be a single file or a collection of multiple files. In the example where the log file is a collection or archive of multiple files, programs that are associated with the system component 104 may be recorded in a first log file and the programs that are associated with the application component 106 may be recorded in a second log file. Alternatively, the first identifier may be recorded at the first log file and the second identifier may be recorded at the second log file. In some examples, the first computing device 102, through the operating system and/or the security program, may generate a notification (e.g., visual, audio, haptics, and the like) notifying the user that the log file has been generated and may be transferred to the security program. For example, a notification indicating that the log file has been generated may be displayed via the user interface of the security program.

At operation 208, the process can include transmitting the log file from the system component 104 to the application component 106. In some examples, the log file may be transmitted from the diagnostic component 128 to the security program 130 and stored within a portion of the application component 106 associated with the security program 130 (e.g., a portion of the storage that is allocated to the security program 130). In some examples, the log file may be transmitted automatically and immediately when it is generated. In some examples, the log file may be transmitted based on a schedule. In some examples, the security pro-gram may generate and transmit to the system component 104 a request for the log file. In some examples, this request may be generated and transmitted after a predetermined amount of time after the operation 202. In some examples, this request may be generated and transmitted on demand (e.g., by the user after the user is notified that the log file has been generated).

At operation 210, the process can include determining whether to perform a local, on device, analysis or evaluation of the log file for indication(s) of targeted intrusion or a remote analysis of the log file. In some examples, the security program may consider factors such as a processing power at the first computing device 102, an amount of free storage allocated to the security program, an amount of free memory allocated to the security program, a size of the log file, an amount of content within the log file, an amount of charge of a power supply (e.g., a battery) associated with the first computing device 102, and the like. For example, the security program may determine that the processing power, the amount of free storage, the amount of free memory, and/or the amount charge of the power supply is less than optimal for performing the local analysis of the log file, and therefore determine that the local analysis of the log file may be performed. For another example, the size of the log file or the amount of the content of the log file may be determined to be small enough to perform the local analysis of the log file (e.g., the log file may be small enough to store within the amount of free storage and/or free memory), and therefore the security may determine to perform the local analysis. If the security program determines the local analysis may be performed, the process 200 may proceed to operation 212. If the security program determines that the remote analysis may be performed, the process 200 may proceed to operation 216.

At operation 212, the process can include determining, at the first computing device 102, whether a program may be indicative of performing the targeted intrusion. In some examples, the operation 212 may be an iterative process where the security program may evaluate each program recorded in the log file for targeted intrusion. In some examples, each program may be evaluated for targeted intrusion based on known indicators of compromise. In some examples, if a name of the program is a known Indicator of compromise, then the program may be determined to be indicative of performing a targeted intrusion. In some examples, the program may be determined to be accessing and/or utilizing a database that is owned or configured to be accessed by a different program and not authorized to be access by the program. In such an example, such an action may be a known indicator of compromise and as a result, the program may be determined to be indicative of performing the targeted intrusion. In some examples, the known indicators of compromise may be a database and/or list of known program names and behaviors (e.g., accessing and/or using a database owned by another program) and the name of the program and/or its behavior may be compared with the database and/or list to determine that the program contains a known indicator of compromise and is therefore indicative of performing the targeted intrusion.

In some examples, determining whether the program may be indicative of performing the targeted intrusion may be a process that involves multiple steps. In some examples, the first step may be determining whether the program may be indicative of bypassing a restricted mode. In some examples, the restricted mode may be a mode where the program is only permitted limited access to system resources, only able to modify its own settings and files, and would not have an elevated or administrator privilege that would permit the program to modify system level (e.g., settings in other programs, settings that change the functions of the operating system, and the like) settings or and files or access resources that are only accessible to programs with elevated or administrator privilege (e.g., accessing and/or manipulating (e.g., copying, modifying, deleting, and the like) files, databases, and libraries that require administrator privilege, accessing and/or manipulating files, databases, and libraries associated with another program, and the like). In some examples, the restricted mode may be the default mode for the program.

In some examples, determining whether the program may be indicative of bypassing the restricted mode may be based on known indicators of bypass. In some examples, the known indicators of bypass may be a same or similar type of indicators as the indicators of compromise. In some examples, once the program is determined to be indicative of bypassing the restricted mode, then at the second step, the program may be evaluated for whether it is also indicative of performing the targeted intrusion. In some examples, if the program is determined to not be indicative of bypassing the restricted mode, then the program would not be further evaluated for whether it is also indicative of performing the targeted intrusion.

At operation 214, the process can include performing an action. In some examples, the action may only be performed upon determining that the program may be indicative of performing the targeted intrusion. In some examples, the action may be notifying the user that one or more programs installed on the first computing device 102 may be indicative of performing the targeted intrusion. In some examples, the notifying the user may be displaying a notification via the user interface of the security program. In some examples, notifying the user may include identifying the program. In some examples, the action may alternatively or additionally include instructions that the user may follow to mitigate further targeted intrusion by the program. In some examples, the action may be notifying an IT administrator that has local and/or remote administrator privilege to operate the first computing device 102 that the program may be indicative of performing the targeted intrusion. In some examples, the action may further include instructions that the IT administrator may follow to mitigate and/or remove the program. In some examples, the action may include automatically stopping, removing, and/or quarantining the program to prevent the program from performing further targeted intrusion of the first computing device 102. In some examples, the action may be performing operation 214 to transmit the log file to a remote computing device such as the second computing device 110 to confirm that the program is indeed indicative of target intrusion and eliminate a potential false positive.

At operation 216 the process can include transmitting the log file to a remote computing component. In some examples, the remote computing component may be the second computing device 110. In some examples, the operation 216 may be transmitting the log file using the network(s) 108 to the second computing device 110. While FIG. 2 illustrates operation 216 as a separate and unrelated step to the operation 212, in some examples, operation 216 may be performed after the operation 212 and concurrently with operation 214. In the example that operation 216 may be performed after the operation 212, in the event that the program is determined to be indicative of performing the targeted intrusion, this indication may be transmitted to the second computing device 110 along with the log file.

As an example of a user experience of the process 200, a user may use the security program to evaluate whether their mobile device (e.g., the first computing device 102) may have been installed with a program that performs a targeted intrusion of the mobile device. As discussed throughout this disclosure, the mobile device may restrict the security program from real time monitoring of its mobile operating system and the programs installed on the mobile device (e.g., by preventing the security program from installing a monitoring component within its kernel). Therefore, the security program may use the log file generated by a diagnostic component (e.g., the diagnostic component 128) of the mobile operating system to evaluate whether program(s) installed on the mobile device may be performing a targeted intrusion of the mobile device.

As a first step, the user may launch the security program. In one example, the user may select, by pressing a virtual on-screen button within a user interface of the security program, an option in the security program to start the evaluation process. In another example, the user interface of the security program may present the user with instructions to press one or more physical buttons on the mobile device (e.g., by pressing a combination of a power, volume, and/or home buttons) to start the evaluation process. For instance, pressing a combination of physical buttons on the mobile device based on instructions presented by the user interface of the security program may trigger the diagnostic component of the mobile operating system to begin generating the log file.

Upon starting the evaluation process, the security program may generate and transmit the request to generate the log file as described in the operation 202 (e.g., at the operation 206). Upon receiving the request and/or based on user presses of hardware buttons or any other command that triggers generation of the log file, the operating system may generate (e.g. at the diagnostic component 128) the log file. In some examples, while the operating system is generating the log file, the user interface of the security program may be updated with a real time progress indicator showing the progress of the log file being generated.

In some examples, once the log file has been generated, the security program may inform the user (e.g. using its user interface and/or through a notification) that the log file is ready. In some examples, the security program may inform the user that the log file is ready once the log file is generated at the diagnostic component 128. In this example, the user may select an option using the user interface of the security program to transfer the log file to the security program or the user interface of the security program may provide instructions to the user to allow the user to manually transfer the log file to the security program (e.g., at the end of the operation 206, providing the user with the option or instruction to perform the operation 208). In some examples, the security program may automatically transfer the log file to the security program (e.g., perform the operation 208 without user input and from the diagnostic component 128) upon the log file being generated and may inform the user that the log file is ready once the log file is transferred to the security program.

Figure 3:
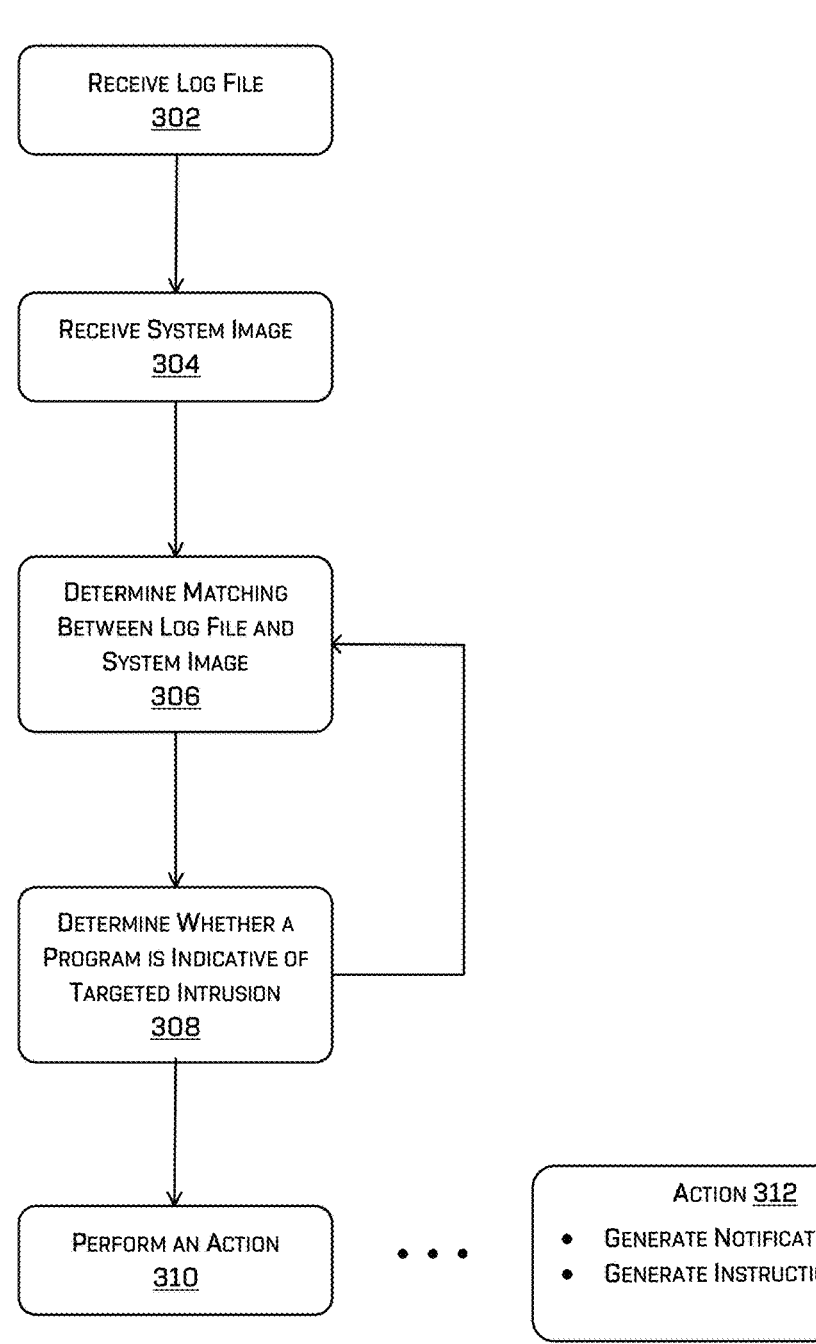
FIG. 3 is an illustration an example process of analyzing a log file for targeted intrusion and performing an action based on that, as described herein.
Figure 4:
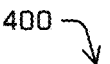
FIG. 4 is an illustration of an example process of evaluating a log file based on a system image, as described herein.
Figure 5:
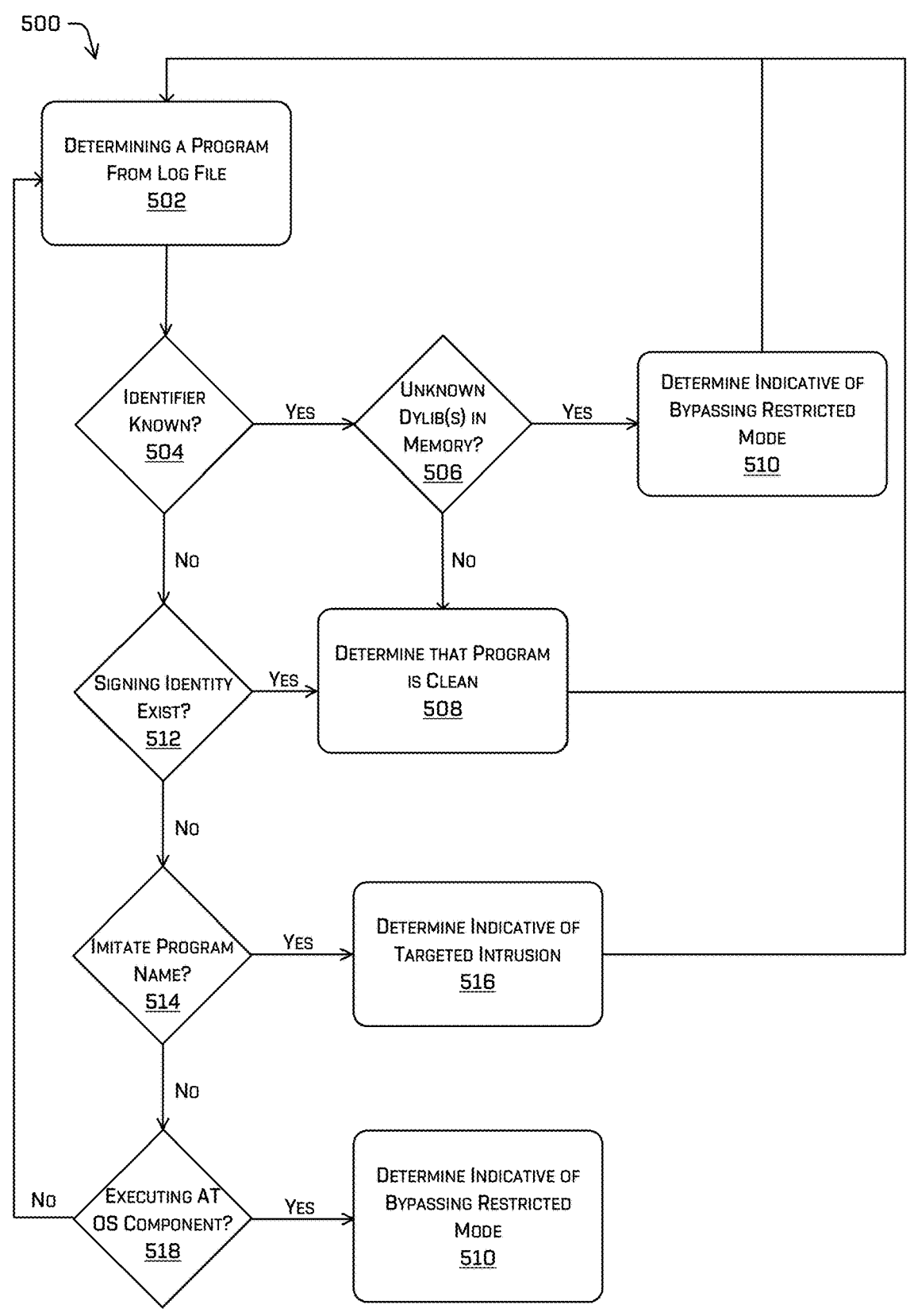
FIG. 5 is an illustration of an example process of evaluating whether program is indicative facilitating a targeted intrusion, as described herein.

Upon the log file being transferred to the security program, in some examples, the user may select an option on the user interface of the security program (e.g., at the operation 210) to evaluate the log file on the mobile device (e.g., perform the operation 212) or to evaluate the log file at a remote computing device (e.g., perform the operation 216 and further described in association with FIGS. 3-5). Upon completion of the evaluation process, the user interface of the security program may present the result of the evaluation (e.g., whether one or more programs may indicate targeted intrusion, any instructions or recommendations if indication(s) of targeted intrusion were determined, and the like).

FIG. 3 is an illustration of an example process 300 of evaluating a log file for targeted intrusion and performing an action based on that, as described herein. The process 300 may be implemented by a computing device such as the second computing device 110 of FIG. 1. The second computing device 110 can implement the log file component 112, the system image component 114, the analysis component 116, and/or the output component 118 to generate a computer-readable instruction for evaluating the log file for targeted intrusion and performing the action based on that. In some examples, the process 200 may be implemented, at least partly, on a different computing device as shown in FIG. 1.

At operation 302, the process can include receiving a log file. In some examples, the log file may be a same or similar log file as described and illustrated in accordance with FIGS. 1 and 2. In some examples, the log file may be received at the log file component 112 associated with the second computing device 110 via the network(s) 108 from the first computing device 102. In some examples, operation 302 can, in the example where the first computing device 102 performs the operation 210, the indication that one or more programs associated with the log file may be indicative of performing the targeted intrusion. In some examples, the indication may be received at the log file component 112 along with the log file.

At operation 304, the process can include receiving a system image. In some examples, the system image may be received at the system image component 114 associated with the second computing device 110. In some examples, the system image may be an image of the operating system associated with the first computing device 102 at its initial state as shipped from a manufacturer of the first computing device 102 (also referred to as a factory state), the release by a developer of the operating system and/or as a state of the first computing device 102 as sold by a firsthand retailer. In some examples, system image is devoid of user installed programs but may include programs installed by both the manufacturer of the first computing device 102 and the developer of the operating system. In some examples, the second computing device 110 may generate a request for the system image, transmit the request to the third computing device 120 via the network(s) 108, and the third computing device 120 may transmit the system image to the second computing device 110 via the network(s) 108 based on the request. In some examples, the request may include identifiers from the log file, and the third computing device 120 may generate the system image based on the identifiers. Additional details with respect to the operation 304 are discussed in connection with FIG. 4, as well as throughout this disclosure.

At operation 306, the process can include determining a difference between the log file and the system image. In some examples, the operation 306 may include determining a log file identifier associated with a program recorded within the log file, determining system image identifiers associated with all programs associated with the system image, and determine a difference between the identifier associated with the program and all identifiers associated with the system image. In some examples, each log file identifier may be unique within the log file and each system image identifier may be unique within the system image, but a log file identifier may match or correspond with a system image identifier. In some examples, when the log file identifier matches one of the system image identifiers, then this may be an indication that the program associated with the log file identifier is a program that was a part of the operating system or the first computing device 102 during its factory state which may be a strong indicator that the program is not indicative of performing the targeted intrusion. In such a scenario, the process 300 may end for this program, and the operation 306 may determine whether another program's log file identifier matches any of the system image identifiers. Alternatively or additionally, in such a scenario, the program may be further evaluated for whether the program may be indicative of bypassing the restricted mode. In the scenario where the log file identifier may be determined to not match any of the system image identifiers, this may be a preliminary indicator that the program may be indicative of performing the targeted intrusion and the process 300 may proceed to operation 308.

At operation 308, the process can include determining whether a process may be indicative of performing the targeted intrusion. In some examples, as discussed above, the operation 308 may be performed when a log file identifier associated with a program associated with the log file does not match any of the system image identifiers. In some examples, all programs associated with the log file may be evaluated for whether targeted intrusion regardless of whether an associated log file identifier matches one of the system image identifiers. In some examples, the operation 308 may include determining whether the program is associated with a second log file identifier and whether the name of the program imitates a name of a program associated with the developer of the operating system or the manufacturer of the first computing device 102. Additional details with respect to the operation 306 are discussed in connection with FIG. 4, as well as throughout this disclosure. In some examples, as illustrated, the operations 304 and 306 may be performed in an iterative cyclical fashion where each program associated with the log file is evaluated at the operations 306 and 308 iteratively. For example, a first program may be evaluated at the operations 306 and 308, and once that is completed, a second program may then be evaluated at the operations 306 and 308 until all files associated with the log file has been evaluated at the operations 306 and 308. In some examples, some or all programs associated with the log file may be evaluated the operations 306 and 308 in parallel, that is each program may be evaluated at the operations 306 at the same time and at the operation 308 at the same time.

At operation 310, the process can include performing an action. In some examples, the action may be action 312, as illustrated, such as generating a notification or generating instructions. In some examples, the action may be performed at or by the output component 118. In some examples, generating the notification may be sending instructions to the first computing device 102 and/or the fourth computing device 124 to generate the notification on those respective devices. In some examples, the notification may include informing the user of the first computing device 102 and the IT administrator associated with the fourth computing device 124 of the programs associated with the log file that may indicate targeted intrusion, the programs that may indicate bypassing the restricted mode, the programs that may be clean, in the event that the first computing device 102 performed operation 210, whether any false positives or false negatives were determined, and the like. In some examples, generating instructions may be the same or similar steps as those taken for generating the notifications. In some examples, the instructions may be steps that that the user or the IT administrator may take to mitigate targeted intrusion. In some examples, the instructions may be procedures that the user or IT administrator may take to mitigate further harm that may be presented by the program. In some examples, the instructions may be computer readable instructions provided to the security program associated with the first computing device 102 to cause the security program to remove, quarantine, or otherwise mitigate or prevent the program that may be indicative of performing the targeted intrusion from further executing on the first computing device 102. In some examples, the instructions may also include computer readable instructions to cause the security program to remove, quarantine, or otherwise mitigate or prevent a program that may be indicative of bypassing the restricted mode from further executing on the first computing device 102. In some examples, the second computing device 110 may communicate with the first computing device 102 and the fourth computing device 124 via the network(s) 108 to perform the operation 310. In some examples, multiple actions may be performed at the operation 310 either concurrently or one at a time.

FIG. 4 is an illustration of an example process 400 of evaluating a log file based on a system image, as described herein. The process 400 as illustrated may be performed at the second computing device 110. Alternatively, the process 400 may be performed at the first computing device 102, for example, as a part of the operation 210.

At operation 402, the process can include determining log file identifiers. In some examples, the identifiers may be identifiers 412. Examples of log file identifiers may be, but are not limited to, device model, operating system version, program details, signing identities, unique program identifiers (e.g., universally unique identifier (UUID)), and the like. In some examples, the log file identifiers may be identifiers recorded in a log file that is same or similar to the log file described in association with FIGS. 1-3. In some examples, the device model may be a model of the first computing device 102. In some examples, the operating system version may be the version of the operating system associated with the first computing device 102. In some examples, a portion of the program details, a signing identity of the signing identities, and a unique program identifier of the unique program identifiers may be associated with a program associated with the log file. In some examples, the portion of the program details may include a name of the program, one or more libraries that are associated with the program (e.g., static and/or dynamic libraries that the program may be accessing and/or utilizing), and one or more databases that are associated with the program (e.g. databases that the program may be accessing and/or utilizing). In some examples, each program may be associated with a signing identity of the signing identities. In some examples, not all programs may be associated with a signing identity of the signing identities. In some examples, each program may be associated with a unique program identifier of the unique program identifiers. In some examples, both the signing identity and unique program identifier may be a part of the program details rather than as separate entries as illustrated in FIG. 4.

In some examples, the log file may be a single file. In some examples, the log may be a collection of multiple files. For example, the log file may be a first log file and a second log file. In such an example, the first log file may include the device model, the operating system version, the program details, and the unique program identities and the second log file may include the signing identities. It is, however, also contemplated that the device model, the operating system version, the program details, the unique program identities, and the signing identities may be arranged in any combination amongst the collection of multiple files.

In some examples, the log file may be stored within an archive file (e.g., zip, rar, 7z, tar, or the like). As such, in some examples, the archive file may be unarchived during the operation 402. In some examples, the unarchived log file may be stored at a location within the log file component prior to determining the identifiers 412. In some examples, this storage location may be temporary. In some examples, the log file may be loaded into a memory associated with the second computing device 110 prior to determining the identifiers 412.

At operation 406, the process may include generating a system image. In some examples, the system image may be the operating system associated with the first computing device 102 at its initial state. In some examples, the third computing device 120 may receive, from the second computing device 110, a request to generate the system image along with the device model and the operating system version. In some examples, the third computing device 120 may generate the system image based on the device model and the operating system version.

In some examples, the third computing device 120 may include, at the system image component 122, a collection of system images including system images associated with different versions of the operating system that are customized for different models of the first computing device 102 and other devices and system images associated with different versions of the operating system that are generic to the device model (e.g., can work with all device models and/or lacks customizations associated with particular device models). In some examples, generating the system image may include determining a system image from the collection of system images at the system image component 122 that is a best match based on the device model and the operating system version. In some examples, a best match may be a system image that is a same version as the operating system version and customized for the device model. Alternatively, in the absence of device model custom versions of the operating system, the best match may be the system image that is the same version as the operating system version that is generic to the device model.

In some examples, once the system image is generated, the third computing device 120 may transmit the system image to the second computing device 110 via the network(s) 108. In some examples, the system image may be received by the second computing device 110 at the system image component 114. In some examples, the system image may also be in an archive file and may be unarchived at a temporary location at the system image component 114.

At operation 408, the process can include determining system image identifiers. In some examples, the system image identifiers may be unique program identifiers such as identifiers 414 (e.g. UUIDs) associated with programs from the system image. In some examples, the operation 408 may include first identifying and mounting one or more filesystems from the system image that may be associated with the unique program identifiers (e.g., the filesystem(s) where the UUIDs may be stored) in the memory associated with the second computing device 110. In some examples, upon mounting the one or more filesystems, the operations 408 may further include parsing the one or more filesystems to identify all of them system image identifiers. In some examples, each of the system image identifiers may be identified with its associated program. In some examples, the system image identifiers may alternatively be program names, signing identities or any other identifiers that may identify that a program is included in the system image.

At operation 410, the process can include determining a difference between the log file identifiers and the system image identifiers. In some examples, the operation 410 can include determining whether a unique program identifier from the log file matches a system image identifier from the system image. In some example, a difference may be determined when the unique program identifier does not match any of the system image identifiers (e.g., a UUID from the identifiers 412 does not match any UUID from the identifiers 414). In some examples, when a difference is determined then the program associated with the unique program identifier may be categorized as having an unknown unique program identifier. In some examples, being categorized as having an unknown unique program identifier may be a preliminary indication of targeted intrusion, and as a result, other identifiers associated with the program may be utilized to confirm the indication of targeted intrusion. Additional details with respect to confirming the indication of target intrusion are described in association with FIG. 5 as well as throughout this disclosure. In some examples, when a match is determined between a unique program identifier and a system image identifier, then a program associated with that unique program identifier may be categorized as having a known unique program identifier. In some examples, as a result of being categorized as having a known unique program identifier, the program may be further categorized as not indicating any targeted intrusion. In some examples, the program having a known unique program identifier may be further evaluated for whether it may indicate bypassing the restricted mode.

FIG. 5 is an illustration of an example process 500 of evaluating whether a program is indicative facilitating a targeted intrusion, as described herein. Some or all of the process 500 may be performed by one or more components in FIG. 1 such as the second computing device 110, as described herein. However, some or all of the process 500 may additionally or alternatively be performed by any components in FIG. 1 such as the first computing device 102, the third computing device 120, and/or the fourth computing device 124.

At operation 502, the process can include determining a program from a log file to evaluate for targeted intrusion. In some examples, the log file may be a same or similar log file as described in association with FIGS. 1-4. In some examples, the log file may include a record of all programs installed and/or currently executed by the first computing device 102. In some examples, the operation 502 may further include determining that the program has not already been evaluated for targeted intrusion at the second computing device 110 and if so, selecting the program for evaluation of targeted intrusion.

At operation 504, the process can include determining whether a first identifier associated with the program is a known identifier. In some examples, the first identifier may be the unique program identifier as described in association with FIG. 4. In some examples, the operation 504 may further include determining whether a match exists between the identifier and the system image identifiers as described in association with FIG. 4. In some examples, when the match is determined to exist, the process 500 may proceed to operation 506. In some examples, when the match is determined to exist, the program may additionally be determined to not be indicative of performing the targeted intrusion. In some examples, when the match is determined to not exist, the process 500 may proceed to operation 512. In some examples, when the match is determined to not exist, this may be a first preliminary indication of targeted intrusion.

At operation 506, the process can include determining whether the program may be associated with one or more unknown libraries within the memory of the second computing device 110. In some examples, the one or more libraries may be dynamic libraries. In some examples, associating with the one or more unknown libraries may be determined based on the program accessing or utilizing one or more libraries in the memory that are not owned, assigned to the program, or otherwise authorized for access and/or utilization by the program. In some examples, whether the program may be associated with the one or more unknown libraries may be determined by comparing the one or more libraries being accessed or utilized by the program with a database or list of libraries that the program is known to own or access. In some examples, the operation 506 may also determine whether the program may be associated with one or more databases that are not owned by the program, assigned to the program, or otherwise authorized for access and/or utilization by the program. If, at the operation 506, the process is determined to be associated with the one or more unknown libraries, the process 500 may proceed to operation 510. If, at the operation 506, the process is determined to not be associated with the one or more unknown libraries (e.g., the process is associated with only known libraries), the process 500 may proceed to operation 508.

At operation 508, the process can include determining that the program is clean. In some examples, once the program is determined to be clean, the second computing device 110 may perform an action such as generating an notification that the program is clean or generating and transmitting computer readable instructions to the first computing device 102 and/or the fourth computing device 124 for the first computing device 102 and/or the fourth computing device 124 to generate a notification that the program is clean. In some examples, the action may be performed by the output component 118 of the second computing device 110.

At operation 510, the process can include determining that the program may be indicative of bypassing the restricted mode. In some examples, once the program is determined to be indicative of bypassing the restricted mode, the second computing device 110 may perform an action such as generating an notification that the program may be indicative of bypassing the restricted mode or generating and transmitting computer readable instructions to the first computing device 102 and/or the fourth computing device 124 for the first computing device 102 and/or the fourth computing device 124 to generate a notification that the program may be indicative of bypassing the restricted mode. In some examples, the action may also include instructions that instructs the user or the IT administrator to mitigate further harm that may be presented by the program being indicative of bypassing the restricted mode. In some examples, the action may also include computer readable instructions to cause the security program to remove, quarantine, or otherwise mitigate or prevent a program that may be indicative of bypassing the restricted mode from further executing on the first computing device 102.

At operation 512, the process can include determining whether there is a second identifier associated with the program. In some examples, the operation 512 may include determining whether a signing identity is associated with the program. In some examples, the second identifier may be determined based on a database or list of known signing identities. In some examples, the second identifier may be determined by comparing the signing identity with the database or list of known signing identities. In some examples, the signing identity may be a signature that is associated with distributing the program at a program marketplace (e.g. distributing the program at Apple's App Store or Google's Play Store). In some examples, without the second identifier, it would be indicative that the program is not distributed at the program marketplace. In some examples, if the second identifier is determined to be associated with the program, then the process 500 may proceed to operation 508. In some examples, if it is determined that no second identifier is associated with the program, then the process 500 may proceed to operation 514. In some examples, when no second identifier is determined to be associated with the program, this may be a second preliminary indication of targeted intrusion.

At operation 514, the process can include determining whether a name of the program is may be imitating a name of another program. While FIG. 5 illustrates the operation 514 being performed after the operations 504 and 512, in some examples, the operation 514 may be performed independently of the operations 504 and 512. In some examples, the operation 514 may include determining whether the name of the program is imitating a name of a program associated with the system image. In some examples, the operation 514 may include determining whether the name of the program is imitating a name of a program associated with the developer of the operating system or the manufacturer of the first computing device 102. In some examples, determining whether the name of the program is imitating may be based on determining that a Levenshtein distance between the name of the process and the name of the process associated the system image is less than or equal to a threshold Levenshtein distance. In some examples, if the name of the process is determined to be imitating the name of another program, the process may proceed to operation 516. If not, then the process may proceed to operation 518.

At operation 516, the process can include determining that the program may be indicative of performing the targeted intrusion. In some examples, once the program is determined to be indicative of performing the targeted intrusion, the second computing device 110 may perform an action such as generating an notification that the program may be indicative of performing the targeted intrusion or generating and transmitting computer readable instructions to the first computing device 102 and/or the fourth computing device 124 for the first computing device 102 and/or the fourth computing device 124 to generate a notification that the program may be indicative of performing the targeted intrusion. In some examples, the action may also include instructions that instruct the user or the IT administrator of steps that may be taken to mitigate further harm that may be presented by the program. In some examples, the action may also include computer readable instructions to cause the security program to remove, quarantine, or otherwise mitigate or prevent the program from further executing on the first computing device 102.

At operation 518, the process can include determining whether the program may be executing at a system partition. In some examples, the system partition may be the system component 104 of the first computing device 102. In some examples, the program may be determined to be executing at the system partition based on an execution location associated with the program recorded within the log file. In some examples, if the program is determined to be executing at the system partition, then the process 500 may proceed to the operation 510. If no, in some examples, the process 500 may restart at operation 502 to determine the next program for evaluation. In some examples, before restarting at operation 502, the process 500 may first proceed to operation 508.

Figure 6:
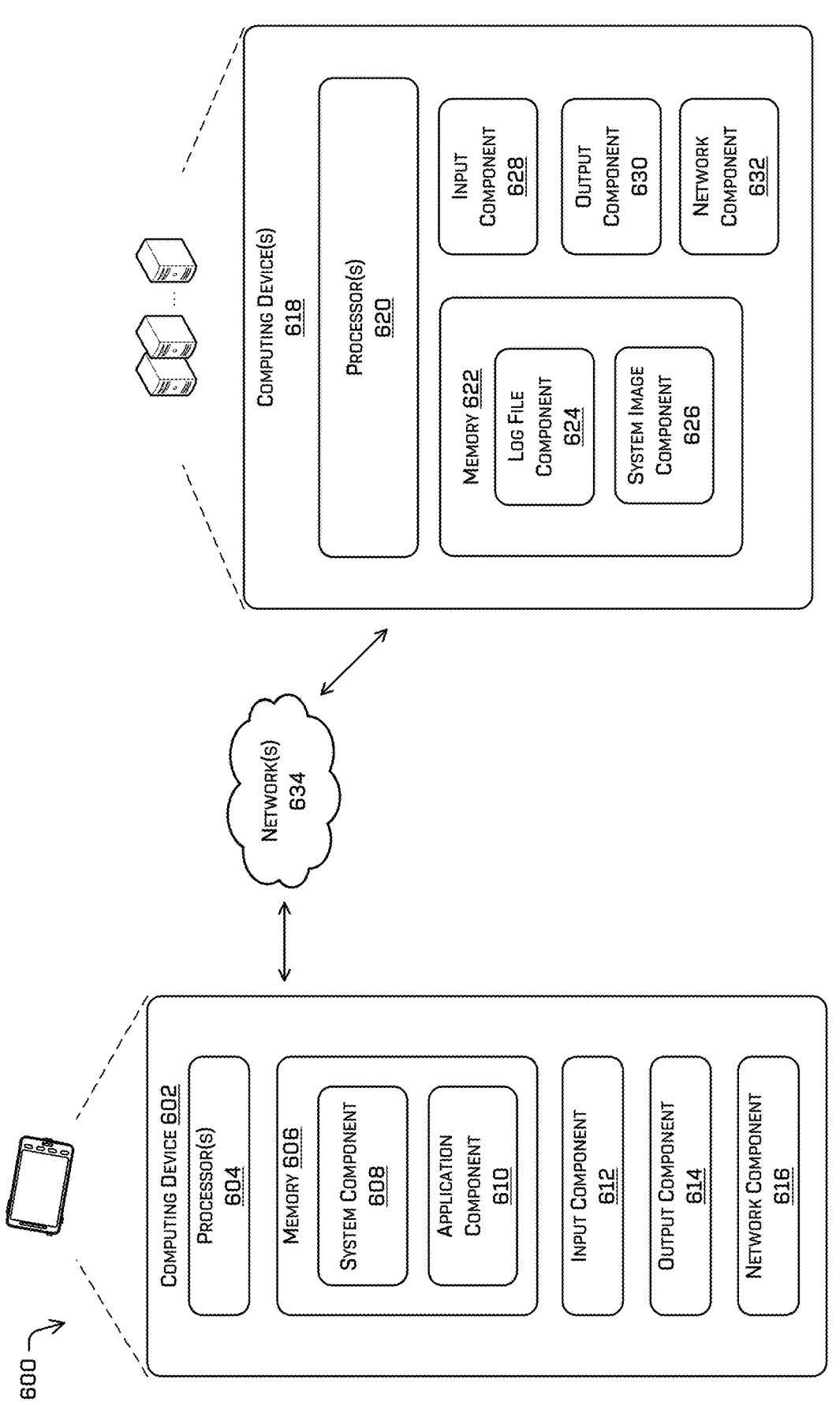
FIG. 6 is a block diagram of an illustrative computing architecture of a first computing device and a second computing device.

FIG. 6 is a block diagram of an illustrative computing architecture 600 of a first computing device 602 and a second computing device 618. In some examples, the first computing device 602 may correspond to a mobile device or the first computing device 102 of FIG. 1. In some examples, the second computing device 618 may correspond to a computing cluster or the second computing device 110 of FIG. 1. It is to be understood in the context of this disclosure that the first and second computing devices 602 and 618 can be implemented as a single device or as a plurality of devices with components and data distributed among them.

As illustrated, the first computing device 602 may comprise a memory 606 storing a system component 608 (also referred to as an OS component) and an application component 610. The first computing device 602 may also include processor(s) 604, an input component 612, an output component 614, and a network component 616. In some examples, steps such as those described in associated with FIGS. 2-5 may be executed by the processor(s) 620.

In some examples, the memory 606 may be volatile (such as RAM), non-volatile (such as ROM, flash memory, etc.) or some combination of the two. In some examples, the system component 608 and the application component 610 may correspond to the system component 104 and the application component 106 of FIG. 1.

In some examples, the memory 606 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The memory 606 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the first computing device 602. Any such memory 606 may be part of the first computing device 602.

As illustrated, the second computing device 618 may comprise processor(s) 620 and a memory 622 storing a log file component 624 and a system image component 626. The second computing device 618 may also include processor(s) 620, an input component 628, an output component 630, and a network component 632. In some examples, the processor(s) 620 may correspond to the analysis component 116 of FIG. 1. In some examples, the output component 630 may correspond to the output component 118 of FIG. 1. In some examples, the output component 118 may correspond to a combination of the output component 630 and the network component 632.

In some examples, the memory 622 may be volatile (such as RAM), non-volatile (such as ROM, flash memory, etc.) or some combination of the two. In some examples, the log file component 624 and the system image component 626 may correspond to the log file component 112 and the system image component 114 of FIG. 1. In some examples, the memory 622 may correspond to a same or similar memory as the memory 606.

In some examples, any or all of the devices and/or components of the computing devices 602 and 618 may have features or functionality in addition to those that FIG. 6 illustrates. For example, some or all of the functionality described as residing within any or all of the computing devices 602 and 618 may reside remotely from that/those computing devices 602 and 618, in some implementations.

In some examples, the first computing device 602 and the second computing device 618 may be configured to communicate over a telecommunications network, such as network(s) 634, using any common wireless and/or wired network access technology using the network components 616 or 632 respectively. Moreover, in some examples, the first computing device 602 may be configured to run any compatible device operating system (OS), including but not limited to, Apple IOS, Google Android, Microsoft Windows Mobile, Linux Mobile, as well as any other mobile device OS.

In some examples, the input components 612 and 628 may include input device(s), such as a keypad, a cursor control, a touch-sensitive display, voice input device, and the like, and the output components 614 and 630 may include output device(s) such as a display, speakers, printers, haptics, and the like.

FIGS. 2-5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
    sending, to a system component associated with an operating system and from an application component, first data representing a request to generate a log file indicative of a current state of the system, wherein the first data causes the system component to generate the log file;
    sending, to the system component and from the application component, second data representing a request to access the log file generated by the system component;
    accessing, at the application component, and based at least in part on the second data, the log file generated by the system component;
    determining, at the application component, a first name associated with a program associated with the log file based on the log file and a system image indicative of an initial state of the system including a second name of a process associated with the system image;

determining, at the application component and based on a Levenshtein distance between the first name and the second name, that the program is indicative of a targeted intrusion of the system; and generating, based at least in part on the log file indicating that the program is indicative of the targeted intrusion of the system, a notification that the system is indicative of targeted intrusion.

2. The system of claim 1, wherein the operations further comprise transmitting the log file from the application component to a remote computing device.

3. The system of claim 1, wherein the operations further comprise:

receiving indicators of compromise; and determining, based at least in part on the indicators of compromise, that the program is indicative of the targeted intrusion of the system.

4. The system of claim 1, wherein the operations further comprises:

generating, by a security program at the application component, the first data; and generating, by the security program at the application component, the second data.

5. The system of claim 4, wherein:

a diagnostic component at the system component generates the log file based on the first data; and accessing the log file comprises receiving the log file from the diagnostic component at the security program.

6. The system of claim 1, wherein determining that the program is indicative of a targeted intrusion of the system includes:

determining that the Levenshtein distance is less than or equal to a threshold Levenshtein distance.

7. The system of claim 1, wherein the operations further comprises:

determining that the first name of the program imitates the second name of the process associated with the system image based on determining that the Levenshtein distance is less than or equal to a threshold Levenshtein distance.

8. A method comprising:

receiving, from a first computing device, a log file generated by an operating system associated with the first computing device, wherein the log file comprises a record of programs installed at the first computing device;

receiving, from a second computing device, a system image;

determining, based at least in part on the system image, a system image identifier;

determining, based at least in part on the log file, a program identifier associated with a program associated with the record of programs;

determining, based at least in part on the system image identifier and the program identifier, that the program is indicative of a targeted intrusion of the operating system by determining a Levenshtein distance between a first name of the program and a second name of the process associated with the system image; and performing, based at least in part on the program being indicative with the targeted intrusion of the operating system, an action to mitigate an execution of the program.

9. The method of claim 8, wherein;

the system image is indicative of an initial state of the operating system; and the log file is indicative of a current state of the operating system.

10. The method of claim 8, wherein determining the system image identifier comprises determining, based at least in part on the system image, a first set of identifiers.

11. The method of claim 8, wherein determining that the program is indicative of the target intrusion of the operating system further comprises determining that the first name of the program imitates the second name of the process associated with the system image.

12. The method of claim 11, wherein determining that the first name of the program imitates the second name of the process associated the system image further comprises:

determining, based on the Levenshtein distance being less than or equal to a threshold Levenshtein distance, that the first name of the program imitates the second name of the process associated with the system image.

13. The method of claim 8, wherein receiving the system image further comprises:

determining, based on the log file, a device identifier associated with a device and an operating system identifier associated with the operating system; and requesting, from a computing device and based at least in part on the device identifier and the operating system identifier, the system image.

14. The method of claim 8, wherein the action comprises at least one of:

generating a notification that the program is indicative of the targeted intrusion of the operating system; or generating instructions for operating a computing device based on the program being indicative of the targeted intrusion of the operating system.

15. One or more non-transitory computer-readable media comprising instructions that when executed by one or more processors cause the one or more processors to perform operations comprising:

receiving, from a first computing device, a log file generated by an operating system associated with the first computing device, wherein the log file comprises a record of programs installed at the first computing device;

receiving, from a second computing device, a system image;

determining, based at least in part on the system image, a system image identifier;

determining, based at least in part on the log file, a program identifier associated with a program associated with the record of programs;

determining, based at least in part on the system image identifier and the program identifier, that the program is indicative of a targeted intrusion of the operating system by:

determining a Levenshtein distance between a first name of the program and a second name of a process associated with the system image, and determining that the Levenshtein distance is less than or equal to a threshold Levenshtein distance; and performing, based at least in part on the program being indicative with the targeted intrusion of the operating system, an action to mitigate an execution of the program.

16. The one or more non-transitory computer-readable media of claim 15, wherein determining the system image identifier comprises determining, based on the system image, a first set of identifiers.

17. The one or more non-transitory computer-readable media of claim 15, wherein determining that the program is indicative of the target intrusion of the operating system further comprises:

determining, based on the Levenshtein distance being less than or equal to a threshold Levenshtein distance, that the first name of the program imitates the second name of the process associated with the system image.

18. The one or more non-transitory computer-readable media of claim 15, wherein:

the system image is indicative of an initial state of the operating system; and the log file is indicative of a current state of the operating system.

19. The one or more non-transitory computer-readable media of claim 15, wherein receiving the system image further comprises:

determining, based on the log file, a device identifier associated with a device and an operating system identifier associated with the operating system; and requesting, from a computing device and based at least in part on the device identifier and the operating system identifier, the system image.

20. The one or more non-transitory computer-readable media of claim 15, wherein the action comprises at least one of:

generating a notification that the program is indicative of the targeted intrusion of the operating system; or generating instructions for operating a computing device based on the program being indicative of the targeted intrusion of the operating system.

\* \* \* \* \*